US012021304B2

(12) United States Patent
Lin

(10) Patent No.: US 12,021,304 B2
(45) Date of Patent: Jun. 25, 2024

(54) MULTI-BEAM ANTENNA MODULE

(71) Applicant: WANSHIH ELECTRONIC CO., LTD., New Taipei (TW)

(72) Inventor: Hung-Hsuan Lin, New Taipei (TW)

(73) Assignee: WANSHIH ELECTRONIC CO., LTD., New Taipei (TW)

( * ) Notice: Subject to any disclaimer, the term of this patent is extended or adjusted under 35 U.S.C. 154(b) by 84 days.

(21) Appl. No.: 17/865,371

(22) Filed: Jul. 14, 2022

(65) Prior Publication Data

US 2024/0022006 A1 Jan. 18, 2024

(51) Int. Cl.

| | |
|---|---|
| ***H01Q 19/18*** | (2006.01) |
| ***H01Q 3/16*** | (2006.01) |
| ***H01Q 15/16*** | (2006.01) |
| ***H01Q 19/185*** | (2006.01) |
| ***H01Q 21/26*** | (2006.01) |

(52) U.S. Cl.

CPC ............ *H01Q 19/185* (2013.01); *H01Q 3/16* (2013.01); *H01Q 15/16* (2013.01); *H01Q 21/26* (2013.01)

(58) Field of Classification Search

CPC .......... H01Q 3/16; H01Q 15/16; H01Q 19/18; H01Q 19/185; H01Q 21/00; H01Q 21/06; H01Q 21/12; H01Q 21/26

See application file for complete search history.

(56) References Cited

U.S. PATENT DOCUMENTS

| | | | | |
|---|---|---|---|---|
| 6,587,448 | B1 * | 7/2003 | Dajer | H04W 88/08 370/335 |
| 8,743,008 | B2 * | 6/2014 | Kim | H01Q 3/06 343/882 |
| 9,397,395 | B2 * | 7/2016 | Boutayeb | H01Q 3/24 |
| 10,811,783 | B2 * | 10/2020 | Cheng | H01Q 19/18 |
| 11,043,755 | B2 * | 6/2021 | Farzaneh | H01Q 21/26 |
| 11,575,217 | B2 * | 2/2023 | Patel | H01Q 3/267 |
| 2017/0214145 | A1 | 7/2017 | Elad et al. | |

FOREIGN PATENT DOCUMENTS

CN 102656745 A 9/2012

OTHER PUBLICATIONS

Office Action dated Jun. 13, 2023 of the corresponding Taiwan patent application No. 111119286.

* cited by examiner

*Primary Examiner* — Tho G Phan

(74) *Attorney, Agent, or Firm* — Chun-Ming Shih; HOLS IPR SERVICES

(57) ABSTRACT

A multi-beam antenna module includes a radio frequency circuit board, a plurality of reflecting plates and a plurality of area coverage feed antenna groups. Each of the area coverage feed antenna groups includes a feed antenna. The reflecting plates have different arrangement directions, and each of the reflecting plates is arranged relative to the feed antenna of each of the area coverage feed antenna groups, thereby changing a radiation pattern of the feed antenna of each of the area coverage feed antenna groups to deflect a main radiation direction of the feed antenna of each of the area coverage feed antenna groups.

5 Claims, 16 Drawing Sheets far-field gain Abs (Phi=0)

Theta / deg vs. dBi far-field gain Abs (Phi=90)

Theta / deg vs. dBi

MULTI-BEAM ANTENNA MODULE

BACKGROUND

Technical Field

The present disclosure relates to an antenna module, and especially relates to a multi-beam antenna module.

Description of Related Art

In the applications of the wireless communication and the radar, there are many situations that require the wide signal coverage. In the related art planar antenna and the related art antenna array, the gain of a single antenna is opposite to the coverage angle; namely, if the gain of the antenna is higher, the beam of the antenna is narrower and the beam of the antenna can be transmitted farther, but the angle range of the beam of the antenna is limited; if the gain of the antenna is lower, the beam of the antenna is wider and the angle range of the beam of the antenna is larger, but the transmission distance of the beam of the antenna is shorter.

FIG. 1 shows a schematic diagram of the appearance of a related art millimeter wave frequency band series-fed patch array antenna. Generally speaking, the radiation beam of the antenna is designed to face the direction of +Z of the Z axis. Three array elements 202 of the antenna are connected in series in the direction of the X axis, so the beam in the X-Z plane is narrower, while the beam in the Y-Z plane is wider. FIG. 2 shows the antenna pattern diagram of the X-Z plane of FIG. 1. FIG. 3 shows the antenna pattern diagram of the Y-Z plane of FIG. 1. In most cases, the +Z of the Z axis will point to the communication target or the measurement area, the Y-Z plane with the wider beam is parallel to the horizontal plane, and the X-Z plane with the narrower beam is placed perpendicular to the horizontal plane, so as to have larger measurement angle and range in the horizontal plane.

FIG. 4 shows a schematic diagram of an arrangement of the related art three-sector antenna. FIG. 5 shows a schematic diagram of the horizontal antenna pattern of FIG. 4. There are many situations where the horizontal plane needs to be completely covered, and one of the solutions is to use the sector division and use multiple groups of antennas with different beam directions to cover all angles of the horizontal plane, as shown in FIG. 4. The multi-antenna connection can be achieved by matching the related art switch circuit or multiple sets of the related art radio frequency transceivers. In the millimeter wave frequency band, the multi-beam antenna arrangement will involve the higher construction cost. In the past, the 1.85 mm radio frequency connector supporting 65 GHz and the 1.0 mm radio frequency connector supporting 110 GHz and their corresponding coaxial cables are all very expensive. The separate structure of the antenna and the transceiver requires multiple sets of the high frequency connectors and the high frequency coaxial cables, which will make the cost very expensive and cannot be used widely. Therefore, in many applications today, the antenna is manufactured with the radio frequency front end or the transceiver on the same circuit board. Due to the limitation of the high frequency loss and the assembly accuracy, most of them are limited to the layout of the active circuit and the antenna feeder plane. Therefore, each sector can achieve the multi-beam result with a set of the plane circuit and the antenna module. However, because many components need to be arranged repeatedly, the cost will increase as well, and the matching between the number of the antennas and the number of the main integrated circuits is also inflexible. For example, many radar integration integrated circuits support multiple sets of the receiving-transmitting antennas, but cannot support multiple sector antennas due to the limited planar layout.

Using a single or less plane circuit with some external mechanisms can also achieve multi-angle multi-beam results. For example, the U.S. Pat. No. 6,933,900 uses the arrangement of the plane convex polygons and the horn antenna formed by the upper housing and the lower housing to achieve the high gain and the multi-angle results. Or for example, the U.S. Pat. No. 7,994,996 uses a plane layout with the external spherical or various plane lenses to achieve the effect of the multi-beam high gain. However, the above two US patents have many restrictions on the arrangement and the radiation pattern of the antenna. For applications in the millimeter wave frequency band, the frequency applicability and the assembly accuracy of the materials need to be considered more, so the cost will be high. In addition, in many radar applications, the transmitting antenna and the receiving antenna are independent and coexisting, and the transmitting antenna and the receiving antenna in the same sector should point to the same azimuth, which will also increase the difficulty of the arrangement.

To sum up, the related arts are not effective in transmitting electromagnetic wave signals to different directions or receiving electromagnetic wave signals from different directions, or the structures are very complicated.

SUMMARY

In order to solve the above-mentioned problems, an object of the present disclosure is to provide a multi-beam antenna module.

In order to achieve the object of the present disclosure mentioned above, the multi-beam antenna module of the present disclosure includes a radio frequency circuit board, a plurality of reflecting plates, a radio frequency integrated circuit, a plurality of area coverage feed antenna groups and a plurality of radio frequency transmission lines. The reflecting plates are arranged relative to the radio frequency circuit board. The radio frequency integrated circuit is arranged on the radio frequency circuit board. The area coverage feed antenna groups are arranged on the radio frequency circuit board. The radio frequency integrated circuit is electrically connected to the area coverage feed antenna groups through the radio frequency transmission lines. Moreover, the radio frequency circuit board is a multi-layer circuit board. The radio frequency integrated circuit includes a transmitter or a receiver. Each of the area coverage feed antenna groups includes a feed antenna. The reflecting plates have different arrangement directions, and each of the reflecting plates is arranged relative to the feed antenna of each of the area coverage feed antenna groups, thereby changing a radiation pattern of the feed antenna of each of the area coverage feed antenna groups to deflect a main radiation direction of the feed antenna of each of the area coverage feed antenna groups.

Moreover, in an embodiment of the multi-beam antenna module of the present disclosure mentioned above, the multi-beam antenna module further includes a plurality of angle adjusting mechanisms arranged on the radio frequency circuit board and connected to the reflecting plates, wherein each of the angle adjusting mechanisms is configured to adjust each of the reflecting plates to change the main radiation direction of the feed antenna of each of the area coverage feed antenna groups.

Moreover, in an embodiment of the multi-beam antenna module of the present disclosure mentioned above, each of the reflecting plates is a flat reflecting plate.

Moreover, in an embodiment of the multi-beam antenna module of the present disclosure mentioned above, each of the reflecting plates is a parabolic curved surface reflecting plate.

Moreover, in an embodiment of the multi-beam antenna module of the present disclosure mentioned above, the feed antenna is a transmitting antenna, a receiving antenna, or a transmitting-receiving antenna.

Moreover, in an embodiment of the multi-beam antenna module of the present disclosure mentioned above, each of the reflecting plates is a free-form curved surface reflecting plate.

The advantage of the present disclosure is to transmit electromagnetic wave signals to different directions effectively or receive electromagnetic wave signals from different directions effectively with a simple structure.

Please refer to the detailed descriptions and figures of the present disclosure mentioned below for further understanding the technology, method and effect of the present disclosure achieving the predetermined purposes. It believes that the purposes, characteristic and features of the present disclosure can be understood deeply and specifically. However, the figures are only for references and descriptions, but the present disclosure is not limited by the figures.

DETAILED DESCRIPTION

Figure 1:
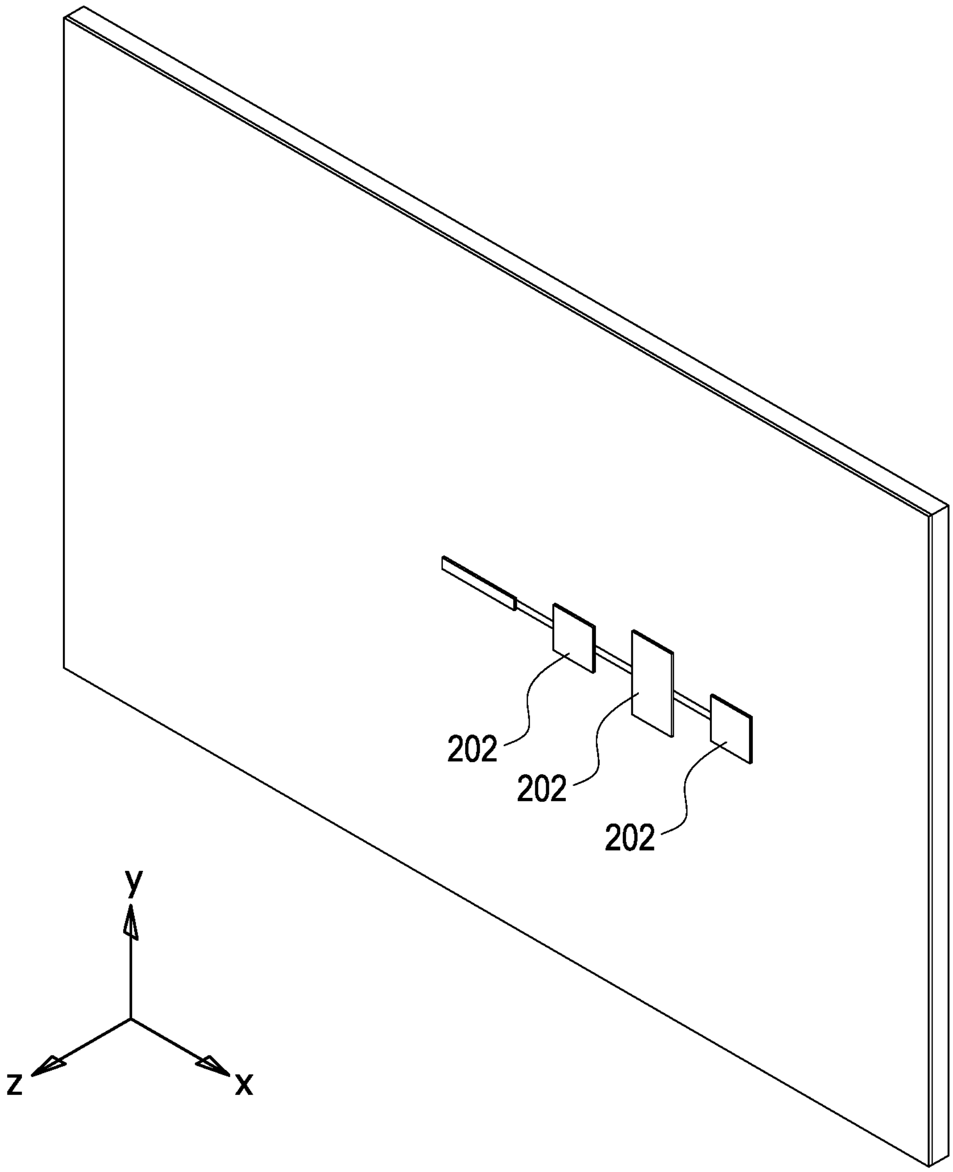
FIG.1 Related Art
FIG. 1 shows a schematic diagram of the appearance of a related art millimeter wave frequency band series-fed patch array antenna.
Figure 2:
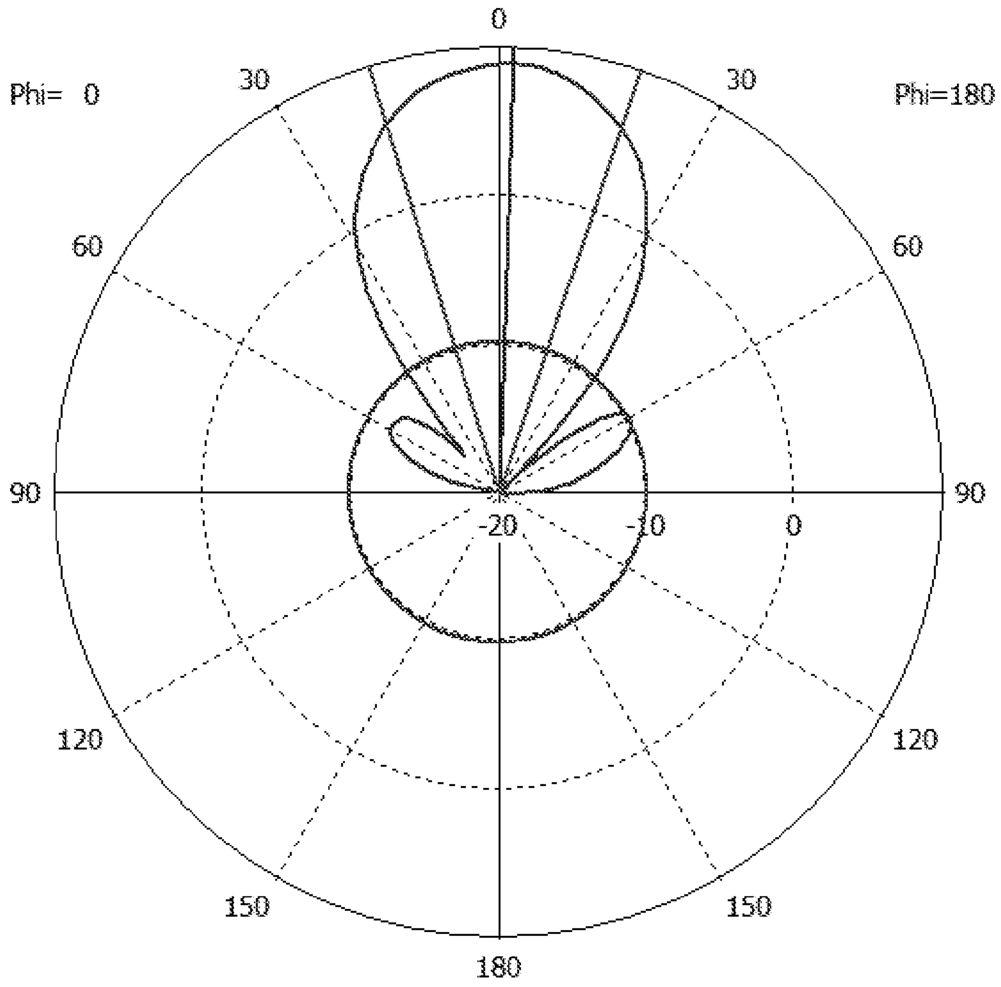
FIG.2 Related Art
FIG. 2 shows the antenna pattern diagram of the X-Z plane of FIG. 1.
Figure 3:
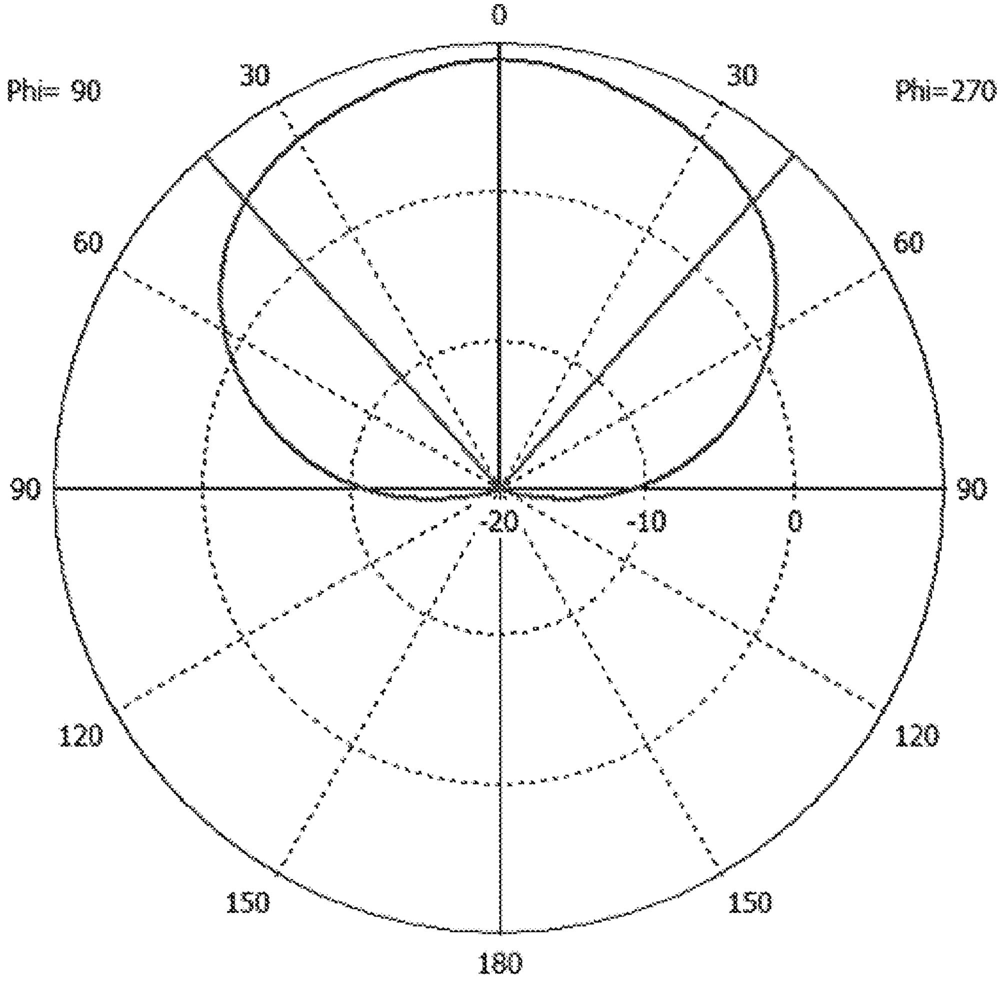
FIG.3 Related Art
FIG. 3 shows the antenna pattern diagram of the Y-Z plane of FIG. 1.
Figure 4:
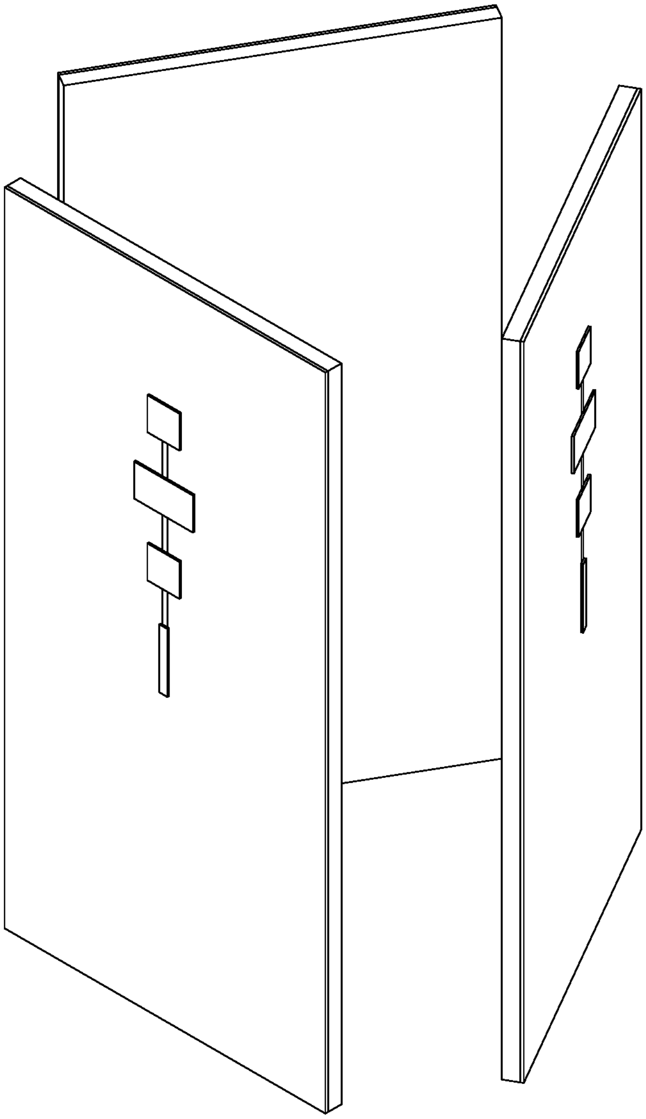
FIG.4 Related Art
FIG. 4 shows a schematic diagram of an arrangement of the related art three-sector antenna.
Figure 5:
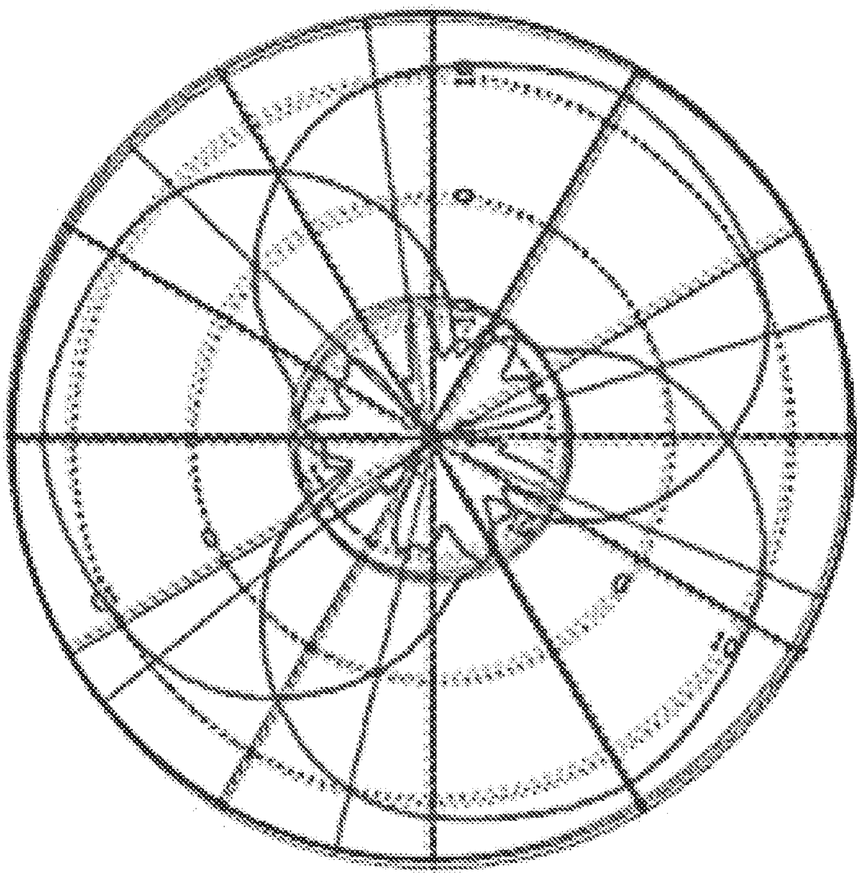
FIG.5 Related Art
FIG. 5 shows a schematic diagram of the horizontal antenna pattern of FIG. 4.
Figure 6:
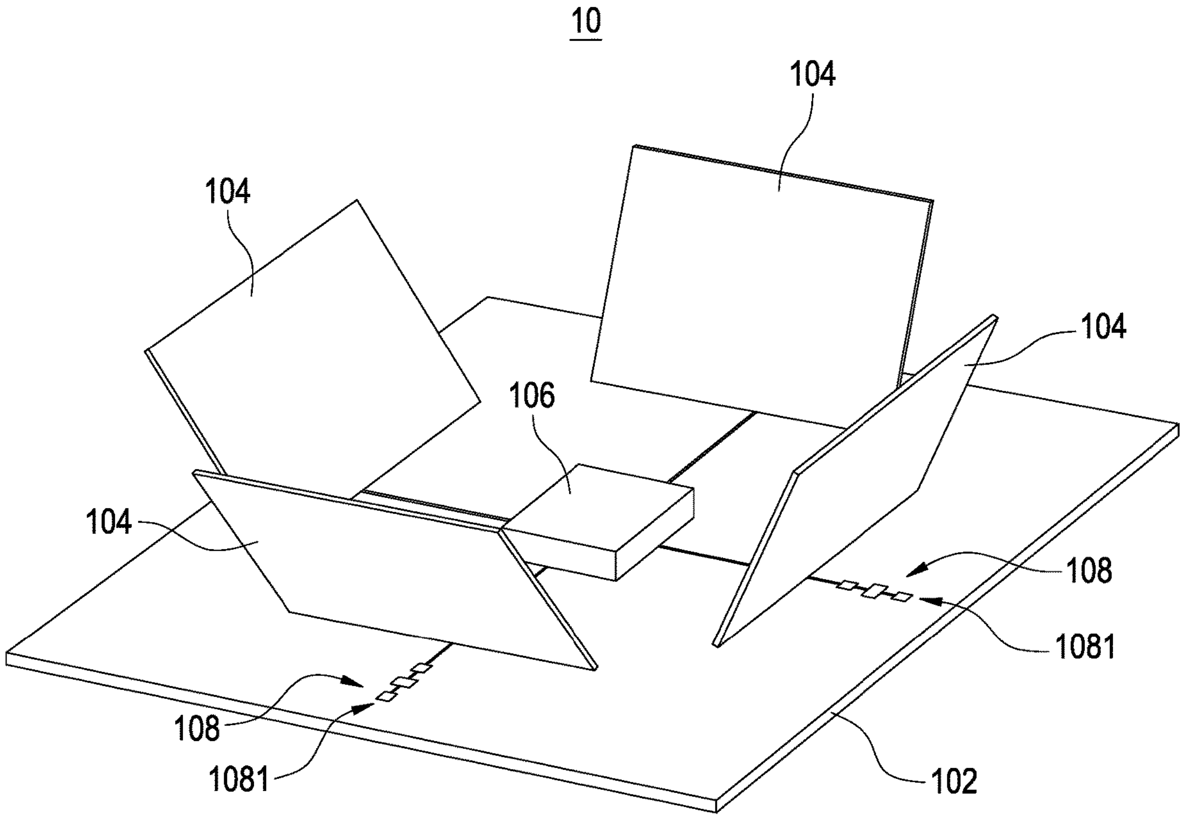
FIG. 6 shows a schematic diagram of the appearance of the first embodiment of the multi-beam antenna module of the present disclosure.

In the present disclosure, numerous specific details are provided, to provide a thorough understanding of embodiments of the disclosure. Persons of ordinary skill in the art will recognize, however, that the present disclosure can be practiced without one or more of the specific details. In other instances, well-known details are not shown or described to avoid obscuring aspects of the present disclosure. Now please refer to the figures for the explanation of the technical content and the detailed description of the present disclosure:

FIG. 6 shows a schematic diagram of the appearance of the first embodiment of the multi-beam antenna module 10 of the present disclosure. As shown in FIG. 6, a multi-beam antenna module 10 of the present disclosure includes a radio frequency circuit board 102, a plurality of reflecting plates 104, a radio frequency integrated circuit 106 and a plurality of area coverage feed antenna groups 108. Each of the area coverage feed antenna groups 108 includes a feed antenna 1081. The reflecting plates 104 are arranged relative to the radio frequency circuit board 102. The radio frequency integrated circuit 106 is arranged on the radio frequency circuit board 102. The area coverage feed antenna groups 108 are arranged on the radio frequency circuit board 102. The radio frequency circuit board 102 is, for example but not limited to, a multi-layer circuit board. The radio frequency integrated circuit 106 may also be referred to as a radio frequency integration integrated circuit. Each of the reflecting plates 101 is, for example but not limited to, a flat reflecting plate.

Figure 10:
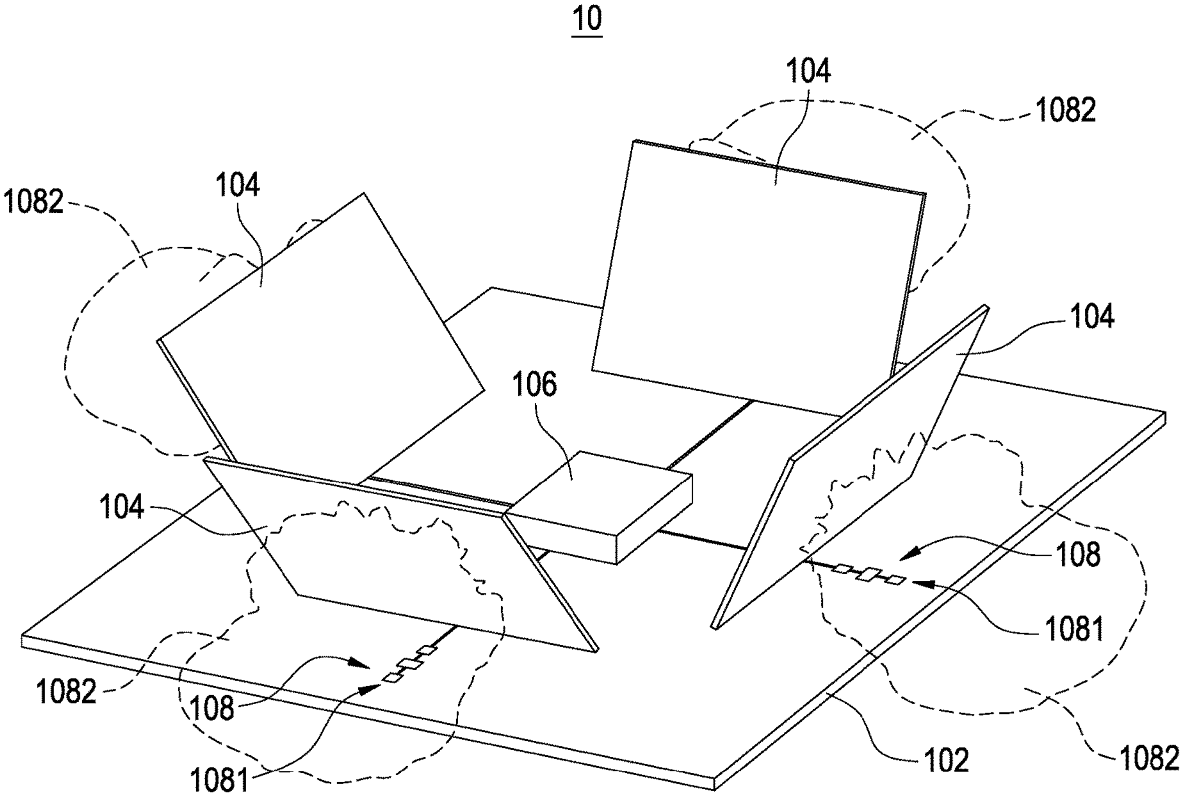
FIG. 10 shows a schematic diagram of the radiation pattern of the first embodiment of the multi-beam antenna module of the present disclosure.

Moreover, the radio frequency circuit board 102 is placed parallel to the ground. The radio frequency integrated circuit 106 is a radio frequency integration integrated circuit (for example but not limited to, TI's AWR2944) for integrating multiple sets of receivers and transmitters, and is connected to the area coverage feed antenna groups 108. Each of the area coverage feed antenna groups 108 is arranged at an edge of the radio frequency circuit board 102; namely, the area coverage feed antenna groups 108 are arranged at edges of the radio frequency circuit board 102. The area coverage feed antenna groups 108 have different arrangement directions. Each of the area coverage feed antenna groups 108 of FIG. 6 includes only one feed antenna 1081, which is suitable for systems with shared antennas for receiving and transmitting. The flat reflecting plate with the appropriate size is arranged above the feed antenna 1081 of each of the area coverage feed antenna groups 108. The sizes, positions and angles of the flat reflecting plates are determined according to the design requirements, and are fixed on the supports (not shown in FIG. 6) or on the housing (not shown in FIG. 6) or arranged on the radio frequency circuit board 102, to deflect the direction of the beam of the feed antenna 1081. Namely, the beam originally vertical to the radio frequency circuit board 102 (i.e., vertical to the ground) will be deflected by the flat reflecting plate to change to generate a large proportion of the horizontal component, which becomes the same all-coverage of the horizontal plane as the related art sector antenna, as shown in FIG. 10 described later.

Moreover, the flat reflecting plate may be formed by cutting metal sheets, or by using plastic materials which are plated metals on the surface, and the production and the assembly are very simple. The flat reflecting plate has no focal length problem, the reflected beam width is similar to the original beam width, the adjustment of the inclination is quite intuitive, and the matching of the antenna does not need to be re-adjusted, so the design and the application of the flat reflecting plate are very simple. A first number of the area coverage feed antenna groups 108 is equal to a second number of the reflecting plates 104; namely, the area coverage feed antenna groups 108 and the reflecting plates 104 are arranged one-to-one. There are gaps between the reflecting plates 104.

Figure 7:
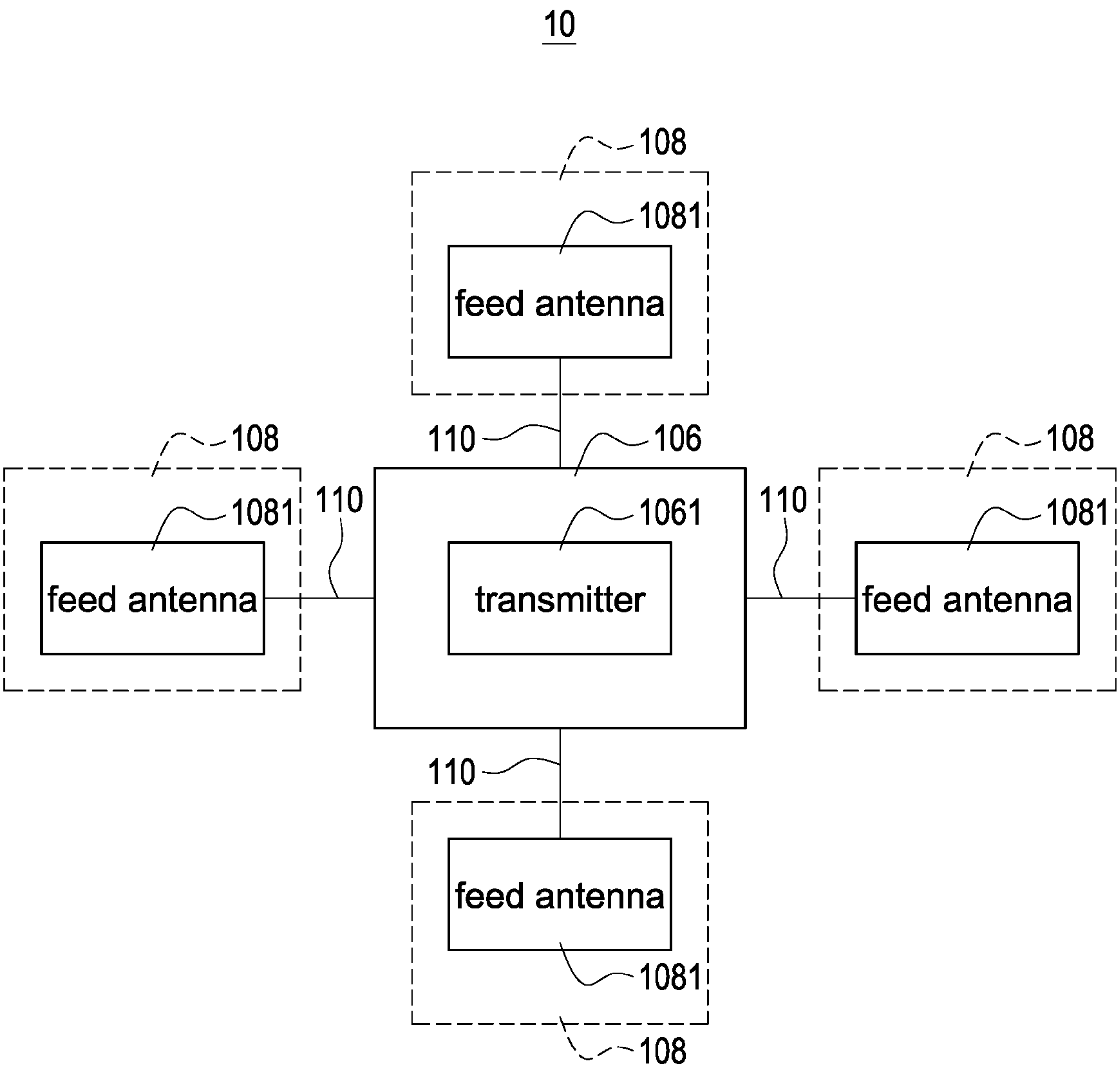
FIG. 7 shows a circuit block diagram of an embodiment of the multi-beam antenna module of the present disclosure.

FIG. 7 shows a circuit block diagram of an embodiment of the multi-beam antenna module 10 of the present disclosure. The descriptions of the elements shown in FIG. 7 which are the same as the elements shown in FIG. 6 are not repeated here for brevity. As shown in FIG. 7, the multi-beam antenna module 10 of the present disclosure further includes a plurality of radio frequency transmission lines 110. The radio frequency integrated circuit 106 includes a transmitter 1061. The radio frequency integrated circuit 106 is electrically connected to the area coverage feed antenna groups 108 through the radio frequency transmission lines 110.

Figure 8:
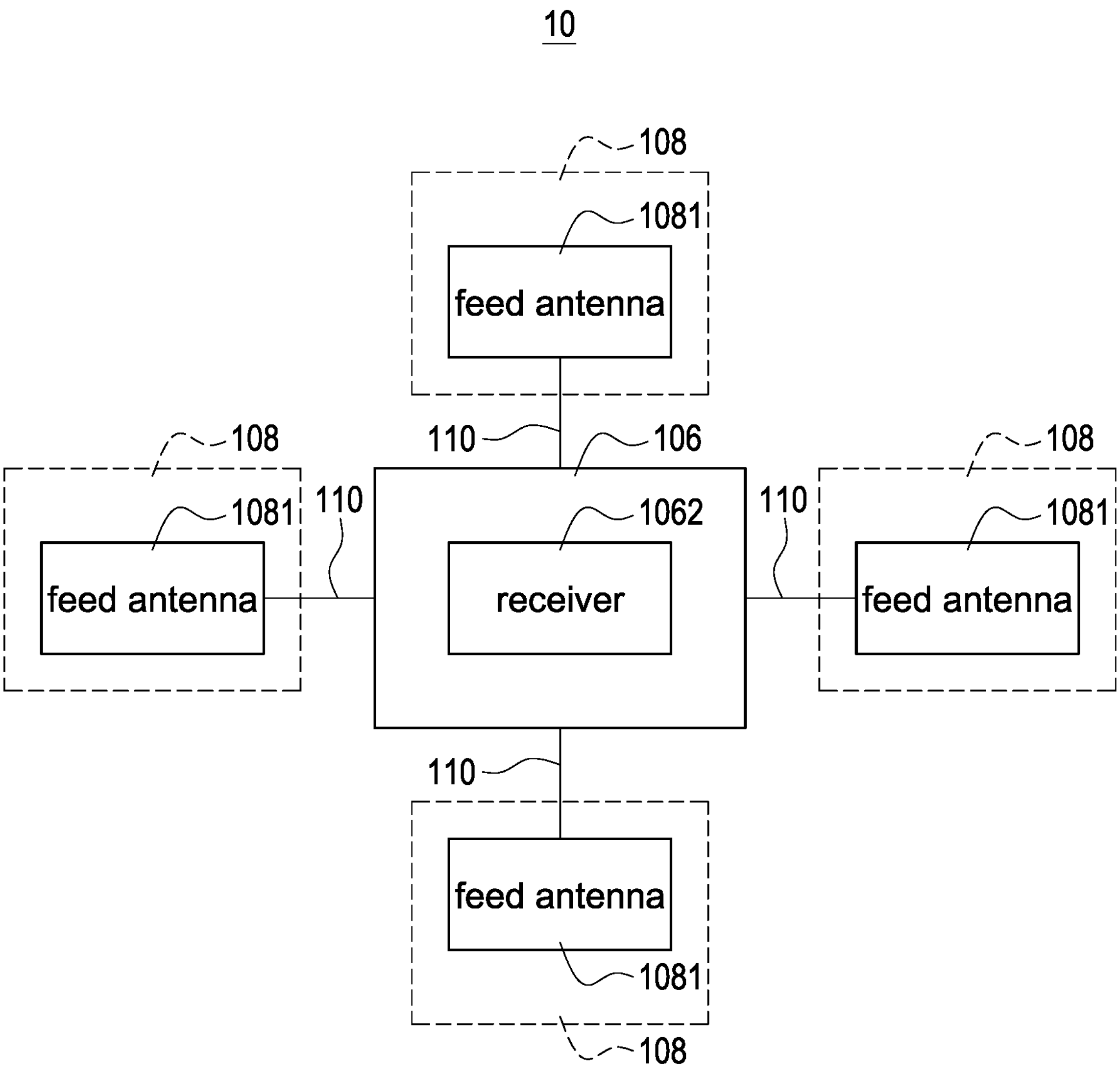
FIG. 8 shows a circuit block diagram of another embodiment of the multi-beam antenna module of the present disclosure.

FIG. 8 shows a circuit block diagram of another embodiment of the multi-beam antenna module 10 of the present disclosure. The descriptions of the elements shown in FIG. 8 which are the same as the elements shown in FIG. 7 are not repeated here for brevity. As shown in FIG. 8, the radio frequency integrated circuit 106 includes a receiver 1062. Namely, the radio frequency integrated circuit 106 of the present disclosure may include the transmitter 1061 shown in FIG. 7 or the receiver 1062 shown in FIG. 8, but the present disclosure is not limited by it; namely, the radio frequency integrated circuit 106 of the present disclosure may include the transmitter 1061 and the receiver 1062 at the same time.

Figure 9:
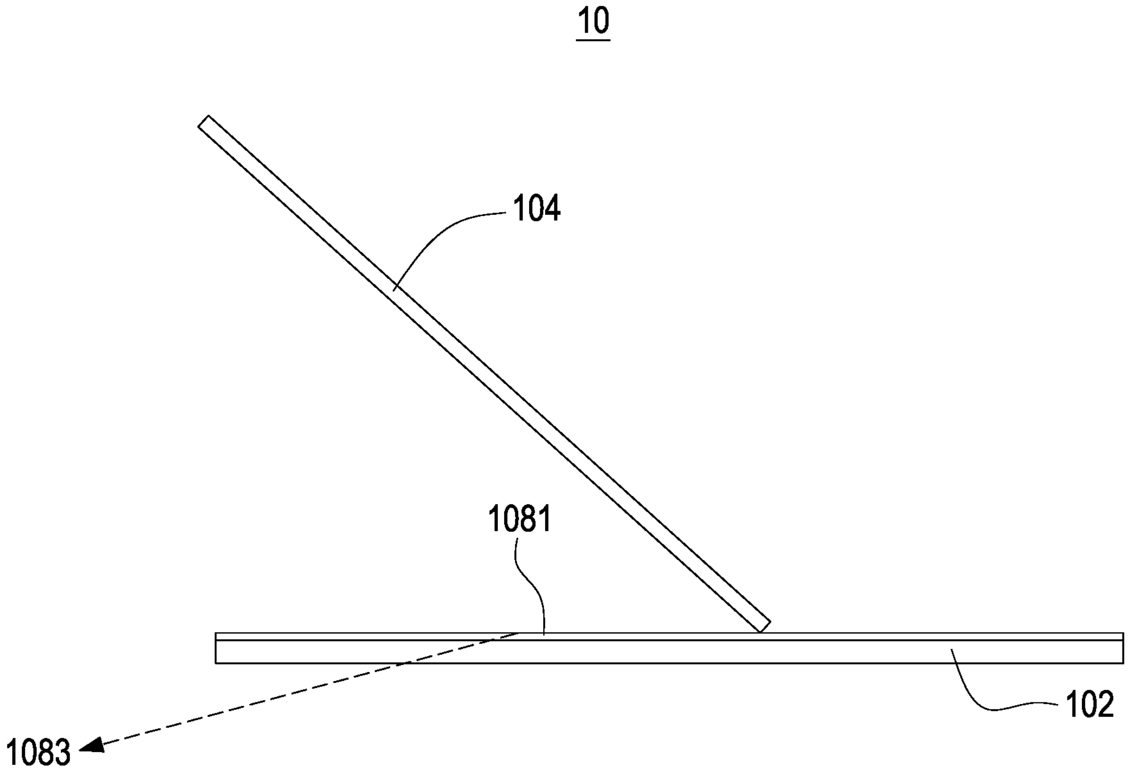
FIG. 9 shows a partial side view of the first embodiment of the multi-beam antenna module of the present disclosure.

FIG. 9 shows a partial side view of the first embodiment of the multi-beam antenna module 10 of the present disclosure. The descriptions of the elements shown in FIG. 9 which are the same as the elements shown in FIG. 6 are not repeated here for brevity. FIG. 10 shows a schematic diagram of the radiation pattern of the first embodiment of the multi-beam antenna module 10 of the present disclosure. The descriptions of the elements shown in FIG. 10 which are the same as the elements shown in FIG. 6 are not repeated here for brevity. Please refer to FIG. 6, FIG. 9, and FIG. 10 at the same time. The reflecting plates 104 have different arrangement directions, and each of the reflecting plates 104 is arranged relative to the feed antenna 1081 of each of the area coverage feed antenna groups 108, thereby changing a radiation pattern 1082 of the feed antenna 1081 of each of the area coverage feed antenna groups 108 to deflect a main radiation direction 1083 of the feed antenna 1081 of each of the area coverage feed antenna groups 108.

Moreover, please refer to FIG. 6, FIG. 9, and FIG. 10 again. In the present disclosure, the radiation pattern 1082 of the feed antenna 1081 of each of the area coverage feed antenna groups 108 is changed to deflect the main radiation direction 1083 of the feed antenna 1081 of each of the area coverage feed antenna groups 108, so that a plurality of the radiation patterns 1082 form an all-coverage radiation pattern toward an outside of the reflecting plates 104.

Figure 11:
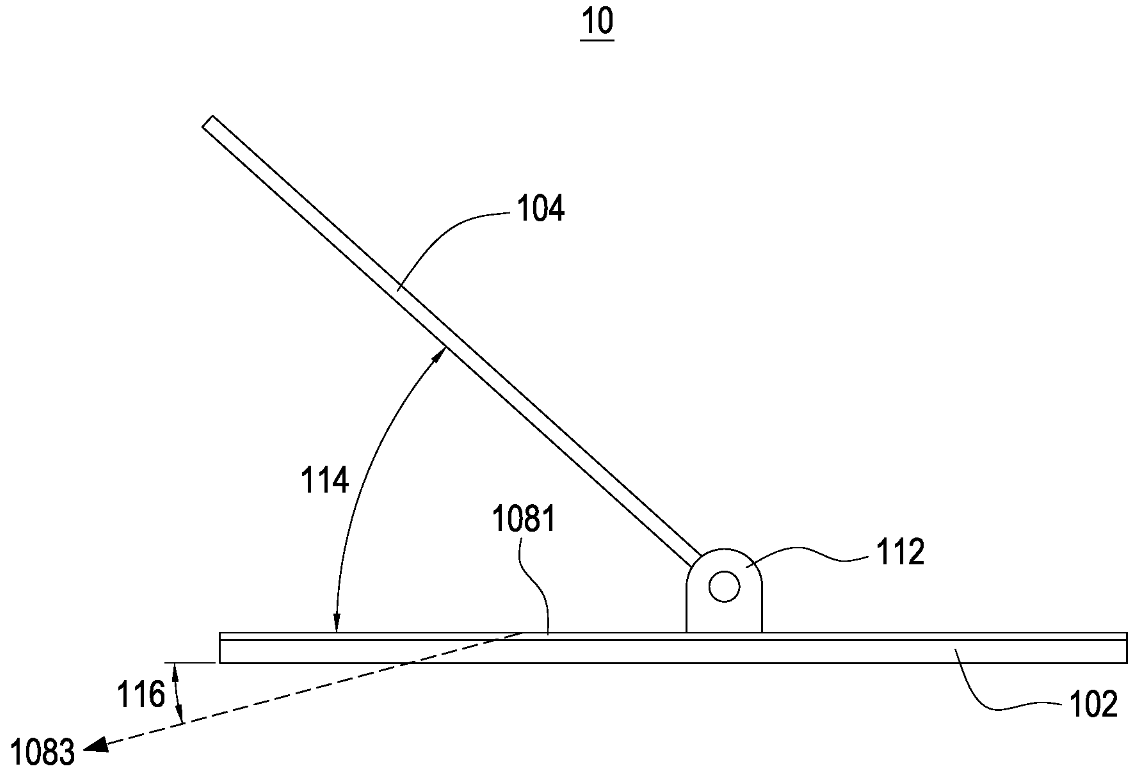
FIG. 11 shows a partial side view of the second embodiment of the multi-beam antenna module of the present disclosure.

FIG. 11 shows a partial side view of the second embodiment of the multi-beam antenna module of the present disclosure. The second embodiment of the multi-beam antenna module 10 of the present disclosure is substantially the same as the first embodiment of the multi-beam antenna module 10 of the present disclosure; the difference is that the second embodiment of the multi-beam antenna module 10 of the present disclosure further includes a plurality of angle adjusting mechanisms 112 arranged on the radio frequency circuit board 102 and connected to the reflecting plates 104; each of the angle adjusting mechanisms 112 is configured to adjust each of the reflecting plates 104 to change the main radiation direction 1083 of the feed antenna 1081 of each of the area coverage feed antenna groups 108.

Figure 12:
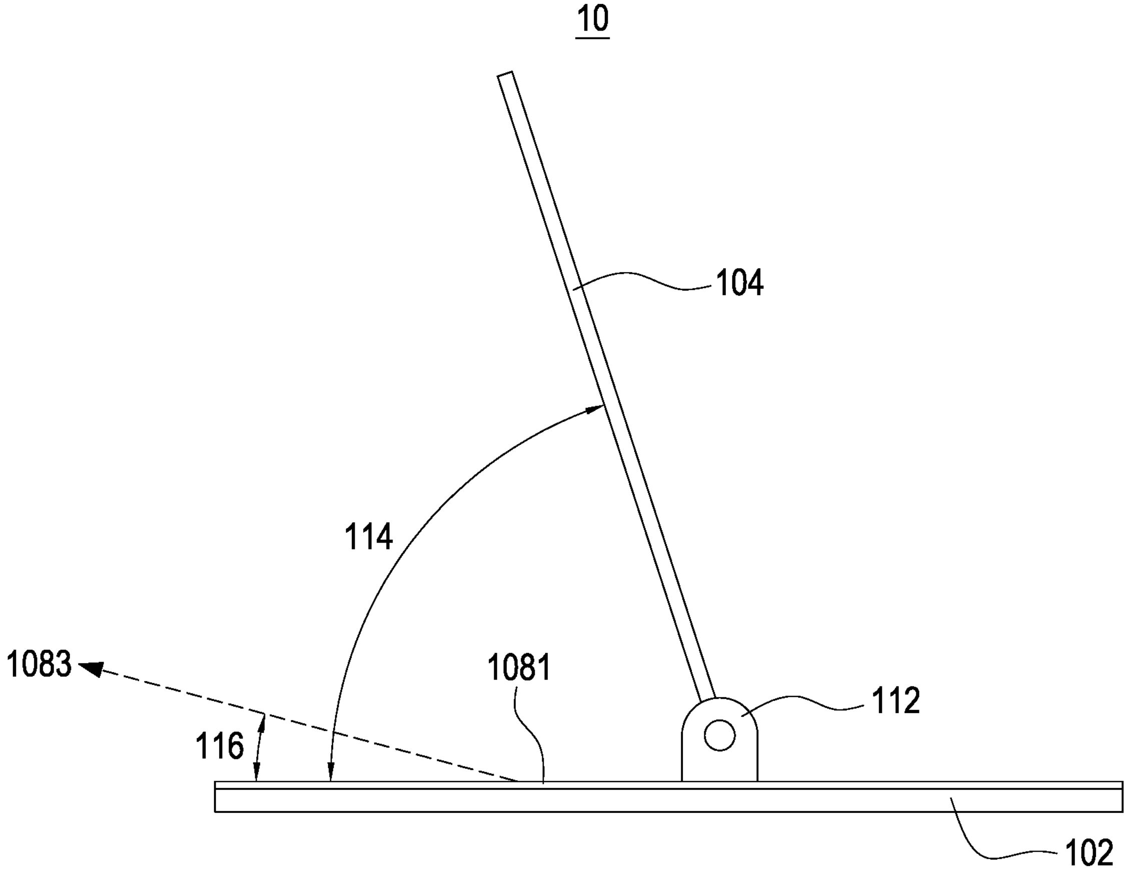
FIG. 12 shows a partial side view of the third embodiment of the multi-beam antenna module of the present disclosure.
Figure 13:
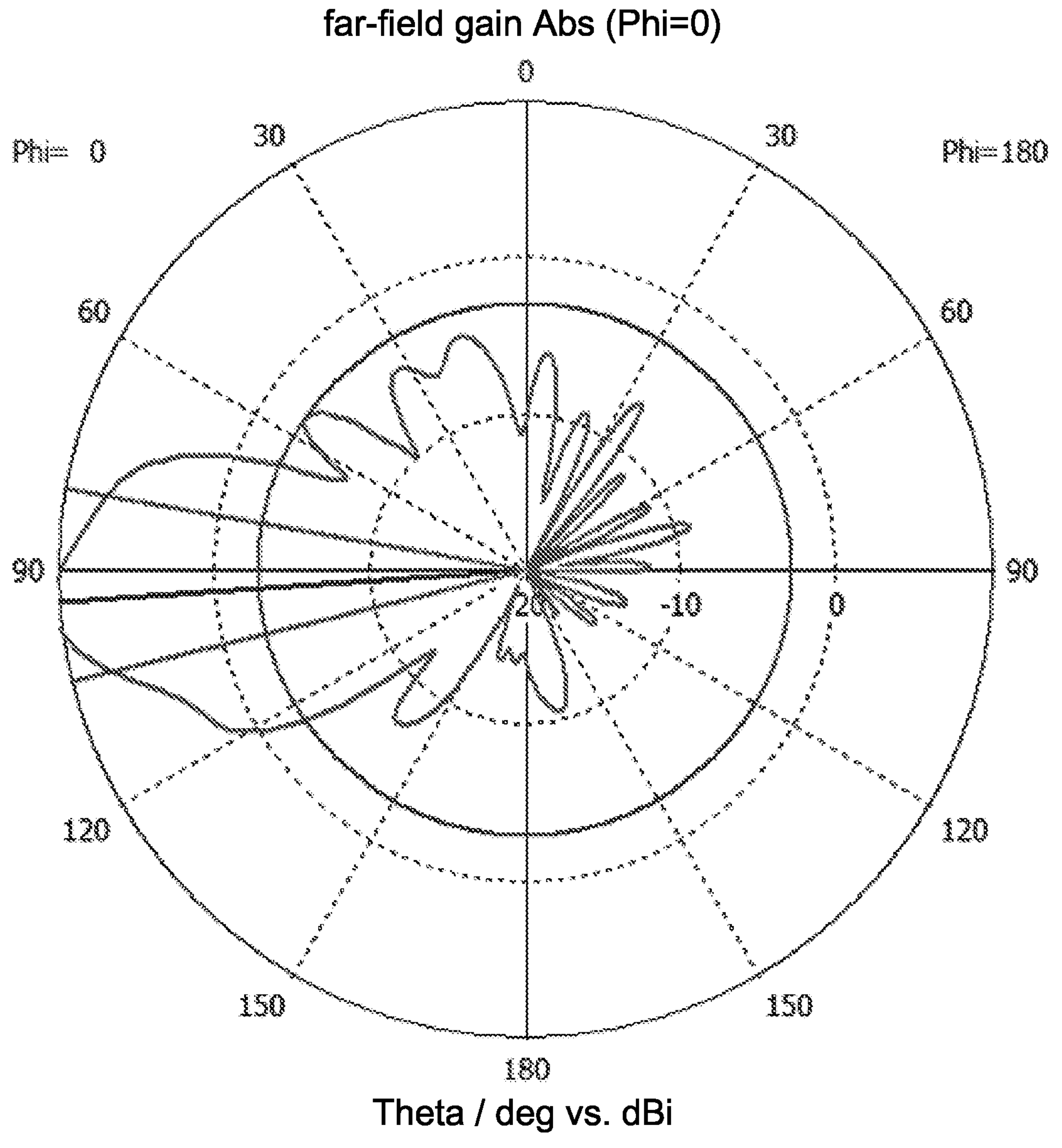
FIG. 13 shows an antenna pattern diagram of the second embodiment of the multi-beam antenna module of the present disclosure.
Figure 14:
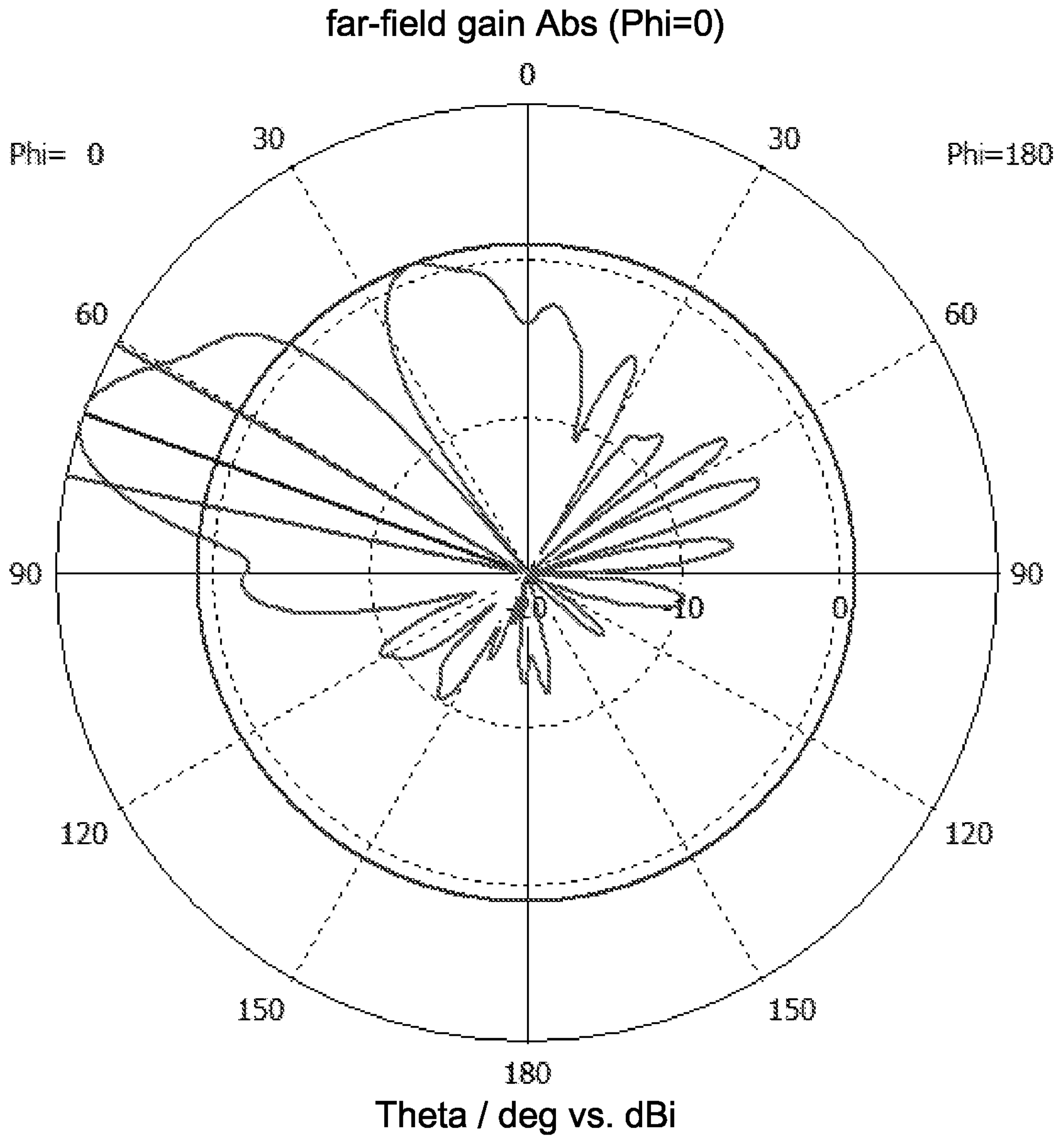
FIG. 14 shows an antenna pattern diagram of the third embodiment of the multi-beam antenna module of the present disclosure.

Moreover, FIG. 12 shows a partial side view of the third embodiment of the multi-beam antenna module 10 of the present disclosure. The third embodiment of the multi-beam antenna module 10 of the present disclosure is substantially the same as the second embodiment of the multi-beam antenna module 10 of the present disclosure. The angle adjusting mechanism 112 is configured to adjust the reflecting plate 104 to change a first included angle 114 between the reflecting plate 104 and the radio frequency circuit board 102 to change a second included angle 116 between the main radiation direction 1083 and the radio frequency circuit board 102. If the first included angle 114 is smaller, the main radiation direction 1083 is more downward; if the first included angle 114 is larger, the main radiation direction 1083 is more upward. Adjusting the first included angle 114 between the reflecting plate 104 and the radio frequency circuit board 102 can adjust an inclination (i.e., the second included angle 116) of the beam on the vertical plane. As shown in FIG. 11, when the first included angle 114 between the reflecting plate 104 and the radio frequency circuit board 102 is 45 degrees, the direction of the beam is close to the horizontal plane and has a small downward angle (for example, the second included angle 116 is 5 degrees). FIG. 11 is suitable for the beam arrangement when the multi-beam antenna module 10 is arranged at a lower position. FIG. 13 shows an antenna pattern diagram of the second embodiment of the multi-beam antenna module 10 of the present disclosure. As shown in FIG. 12, when the first included angle 114 between the reflecting plate 104 and the radio frequency circuit board 102 is 60 degrees, the upward inclination of the direction of the beam is about 20 degrees (namely, the second included angle 116 is about 20 degrees). If the multi-beam antenna module 10 shown in FIG. 12 is hanged upside down and suspended at a high place, the direction of the beam at this time becomes a downward tilt of about 20 degrees, which can provide a proper coverage. FIG. 14 shows an antenna pattern diagram of the third embodiment of the multi-beam antenna module 10 of the present disclosure.

Figure 15:
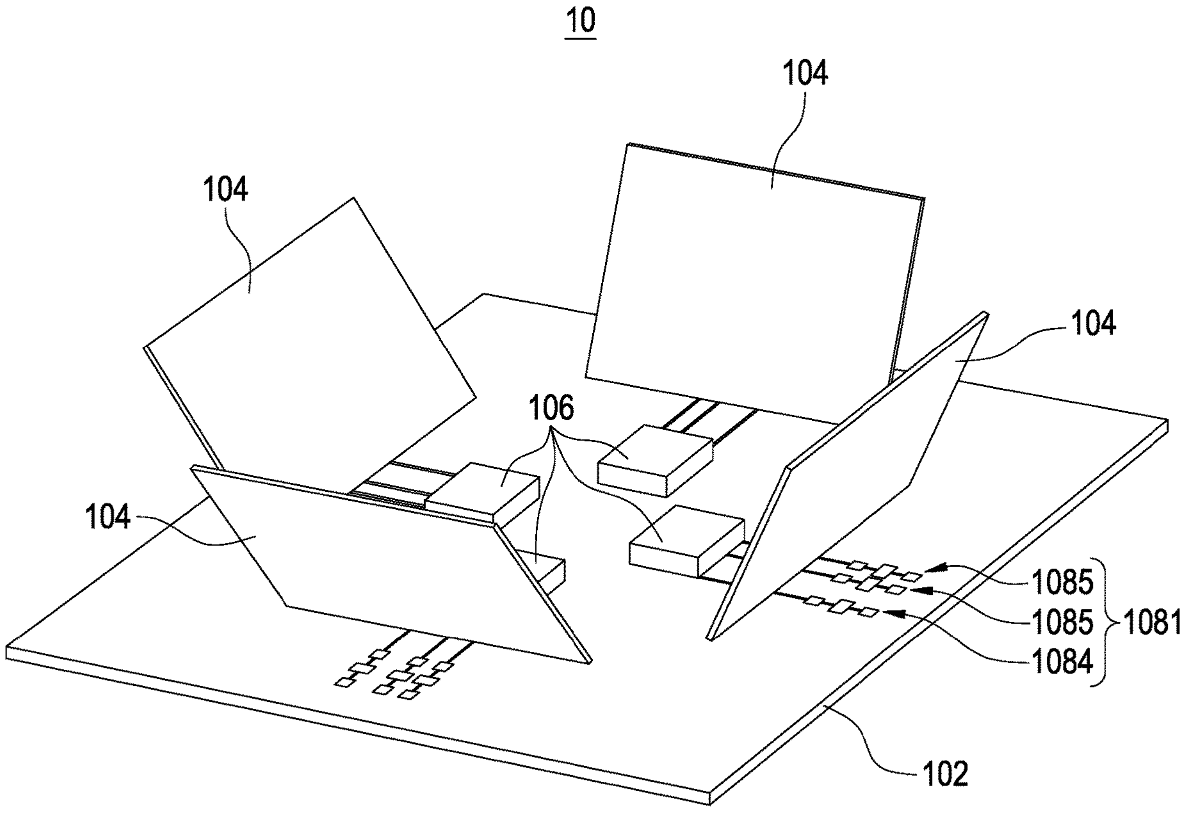
FIG. 15 shows a schematic diagram of the appearance of the fourth embodiment of the multi-beam antenna module of the present disclosure.

FIG. 15 shows a schematic diagram of the appearance of the fourth embodiment of the multi-beam antenna module 10 of the present disclosure. The descriptions of the elements shown in FIG. 15 which are the same as the elements shown in FIG. 6 are not repeated here for brevity. As shown in FIG. 15, the feed antenna 1081 is a transmitting antenna 1084 or a receiving antenna 1085; or, the feed antenna 1081 is a transmitting-receiving antenna (not shown in FIG. 15); namely, depending on the design requirements, the transmitting antenna 1084 can also have a receiving function, or the receiving antenna 1085 can also have a transmitting function, so as to serve as the transmitting-receiving antenna.

Moreover, as shown in FIG. 15, FIG. 15 has four sectors in total, and each sector has multiple antennas, such as 1T2R (one transmitting antenna 1084 and two receiving antennas 1085). Many low-cost millimeter wave radars use different antennas for receiving and transmitting corresponding to different paths to avoid the need for circulators, and multiple groups of receiving antennas can correspond to the arrangement of antenna diversity in communication systems, or correspond to the needs of radar systems for angle detection. Similar to the embodiment of FIG. 6, the embodiment of FIG. 15 uses the flat reflecting plate to change the direction of the beam. Since the number of antennas in each sector increases, the width of the flat reflecting plate should be adjusted appropriately to meet the radiation range of the antenna. In addition, since the total number of antennas increases, which may exceed the specification of the number of receiving-transmitting of a single radio frequency integrated circuit 106, multiple radio frequency integrated circuits 106 (as shown in FIG. 15) are required to operate together, or an additional switching circuit is required (not shown in FIG. 15) to allow the antennas of each sector to operate in a time-sharing manner. The antennas in the same sector have the same or very similar main radiation direction 1083 described above.

Figure 16:
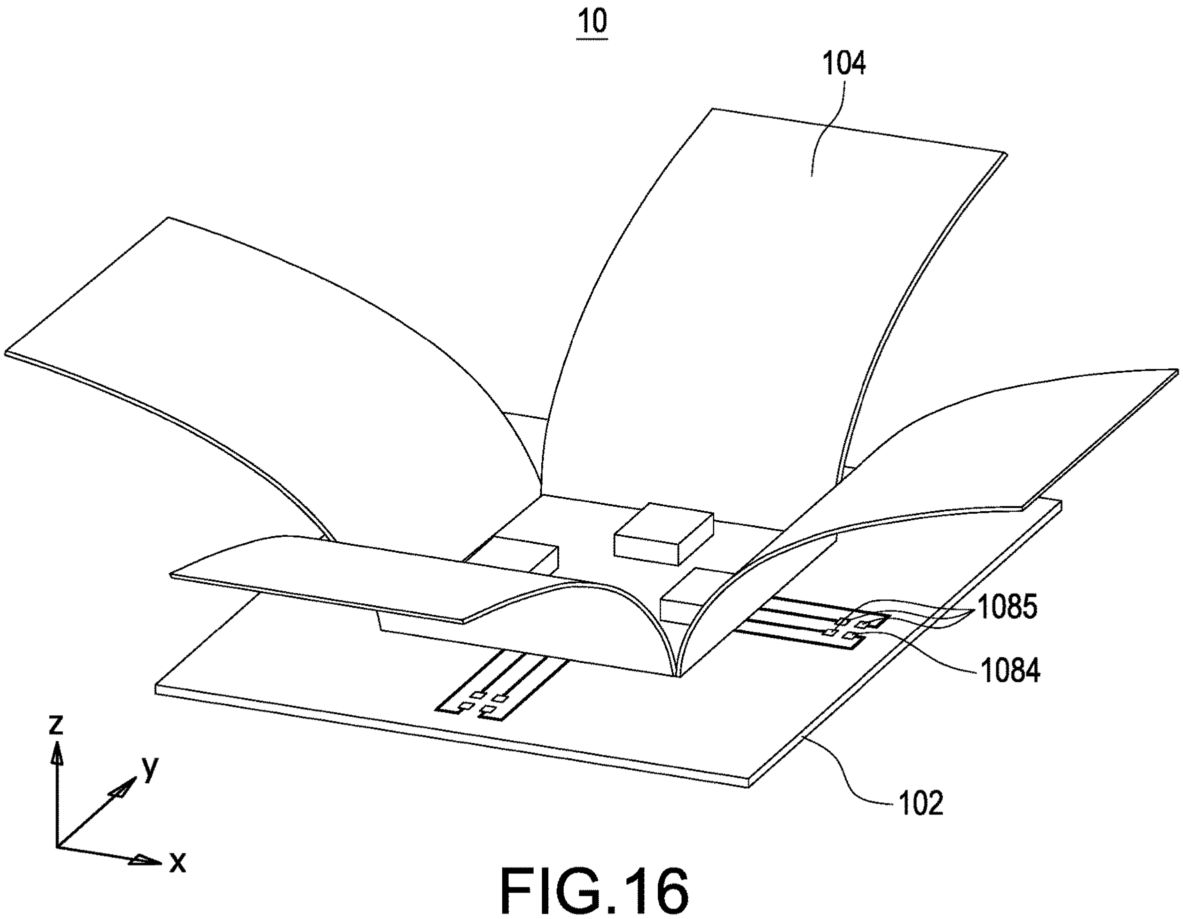
FIG. 16 shows a schematic diagram of the appearance of the fifth embodiment of the multi-beam antenna module of the present disclosure.

FIG. 16 shows a schematic diagram of the appearance of the fifth embodiment of the multi-beam antenna module 10 of the present disclosure. The descriptions of the elements shown in FIG. 16 which are the same as the elements shown in FIG. 15 are not repeated here for brevity. Each of the reflecting plates 104 is a parabolic curved surface reflecting plate or a free-form curved surface reflecting plate.

Moreover, as shown in FIG. 16, the antennas and the reflecting plates 104 are arranged into four sectors, each sector has four independent antennas, each antenna has only one unit, the antennas are closely arranged, and use a 1T3R arrangement (one transmitting antenna 1084 and three receiving antennas 1085). The arrangement of the antennas in FIG. 16 is different from the arrangement of the antennas in FIG. 15, and the reflecting plate 104 in FIG. 16 is different from the reflecting plate 104 in FIG. 15. Taking the sector on the far right in FIG. 16 as an example, the surface of the reflecting plate 104 is formed by translation and expansion of the parabola of the X-Z plane in the direction of the Y axis, and the antennas are arranged near the focal point; such arrangement will make the beam in the X-Z plane have the effect of focusing and concentration, while the Y-Z plane maintains a wider beam to obtain a larger angle coverage. In this embodiment, the reflecting plate 104 can also be rotated to adjust the inclination of the beam on the vertical plane, but when the reflecting plate 104 is rotated, rotating with the focal line as the axis can achieve a more consistent focusing effect. In addition to the reflecting plate 104 which is the flat reflecting plate shown in FIG. 15 and the reflecting plate 104 which is a parabolic curved surface reflecting plate shown in FIG. 16, the shape of the reflecting plate 104 may be a more complex curved surface to achieve a specific antenna radiation energy distribution, such as wider horizontal beam width, or the radiant energy in the FOV (Field of View) angle range is more uniform, and many reflecting mirror design skills can be applied in the disclosure.

To sum up, the technical features of the present disclosure lie in the use of the planar antenna arrangement, with multiple reflecting plates, to achieve multi-beam transmission and reception, and to achieve optimal range coverage through proper arrangement and adjustment. The main features of the present disclosure are as follows:

1. A single printed circuit board is arranged with the planar antenna, and there is no need for additional radio frequency connectors and high frequency coaxial cables, so the present disclosure has the advantage of lower cost.
2. The reflecting plate may be arranged in different forms and sizes according to the needs to achieve the most suitable coverage.
3. The angle of the reflecting plate can be adjusted on site to control the inclination of the beam to adapt to different apparatuses and environments.
4. The present disclosure can optimize the matching of the number of the antennas with the set number of the transmitter/receiver supported by the radio frequency integrated circuit.
5. The present disclosure is suitable for the structure in which the radar transmitting/receiving antennas are separated and arranged side by side.

The advantage of the present disclosure is to transmit electromagnetic wave signals to different directions effectively or receive electromagnetic wave signals from different directions effectively with a simple structure.

Although the present disclosure has been described with reference to the embodiment thereof, it will be understood that the disclosure is not limited to the details thereof. Various substitutions and modifications have been suggested in the foregoing description, and others will occur to those of ordinary skill in the art. Therefore, all such substitutions and modifications are intended to be embraced within the scope of the disclosure as defined in the appended claims.

What is claimed is:

1. A multi-beam antenna module comprising:

a radio frequency circuit board;

a plurality of reflecting plates arranged relative to the radio frequency circuit board;

a radio frequency integrated circuit arranged on the radio frequency circuit board;

a plurality of area coverage feed antenna groups arranged on the radio frequency circuit board;

a plurality of radio frequency transmission lines, the radio frequency integrated circuit electrically connected to the area coverage feed antenna groups through the radio frequency transmission lines; and a plurality of angle adjusting mechanisms arranged on the radio frequency circuit board and connected to the reflecting plates, wherein the radio frequency circuit board is a multi-layer circuit board; the radio frequency integrated circuit comprises a transmitter or a receiver; each of the area coverage feed antenna groups comprises a feed antenna; the reflecting plates have different arrangement directions, and each of the reflecting plates is arranged relative to the feed antenna of each of the area coverage feed antenna groups, thereby changing a radiation pattern of the feed antenna of each of the area coverage feed antenna groups to deflect a main radiation direction of the feed antenna of each of the area coverage feed antenna groups; each of the angle adjusting mechanisms is configured to adjust each of the reflecting plates to change the main radiation direction of the feed antenna of each of the area coverage feed antenna groups.

2. The multi-beam antenna module of claim 1, wherein each of the reflecting plates is a flat reflecting plate.

3. The multi-beam antenna module of claim 1, wherein each of the reflecting plates is a parabolic curved surface reflecting plate.

4. The multi-beam antenna module of claim 1, wherein the feed antenna is a transmitting antenna, a receiving antenna, or a transmitting-receiving antenna.

5. The multi-beam antenna module of claim 1, wherein each of the reflecting plates is a free-form curved surface reflecting plate.

* * * * *